Patented Oct. 9, 1934

1,976,376

UNITED STATES PATENT OFFICE 1,976,376

HYDRATION OF GLYCERIDES

Erwin F. Spellmeyer, East Orange, N. J.

No Drawing. Application May 11, 1932,
Serial No. 610,746

6 Claims. (Cl. 204—9)

This invention relates, generally, to the hydration of glycerides; and the invention has reference, more particularly, to the use of alternating current for speeding up the hydration of glycerides, i. e. the splitting up of vegetable and animal fats and oils to produce fatty acids and glycerine.

The hydration of glycerides is a very important branch of chemical industry and heretofore a number of methods have been used for effecting such hydration. The more prominent of these methods are generally known as the ferment process, sulphuric acid, hydrochloric acid and lime process and the Twitchell process. The ferment process requires considerable attention and constant care during the operation of the process and therefore has not become popular. The acid and alkali processes require the application of pressure to the material being treated and therefore these processes have not become popular. The Twitchell process is the most popular because the same does not require the application of pressure nor considerable attention.

In carrying out the Twitchell process, the fats or oils to be treated are first intermixed with a dilute solution of sulphuric acid and then boiled for about an hour, in order that certain impurities in the oils and fats, such as pectins, albuminous and other materials, will be eliminated, which impurities act as buffers, as regards the emulsifying agent (i. e. Twitchell or other reagent). After these impurities or buffers are removed by the preliminary acid boiling treatment, the glyceride mass is treated with concentrated sulphuric acid and Twitchell reagent in the presence of water. Thus in a typical instance, 1% by weight of concentrated sulphuric acid (60° Baumé), 1% by weight of Twitchell reagent and 40% water is added to 58% of glyceride. These intermixed materials are put into a large wooden vat which contains a perforated steam coil. Superheated steam is then run through this steam coil and serves to bring the mixture up to the boiling point of water, while at the same time the steam passing through the mixture serves to continuously agitate the same. This operation is continued for about eighteen hours and then an additional 1% by weight of concentrated sulphuric acid is added and the same operation continued for sixteen to eighteen hours longer, at the end of which time the glycerides have been completely converted into fatty acids and glycerine. The mass is then allowed to settle and the fatty acids which come to the top, are drawn off and the glycerine which forms the lower layer, is refined for the market. Thus, this hydration operation under the present system takes from thirty-two to thirty-six hours to complete.

In my copending application, Serial Number 595,670, I have disclosed the general application of alternating current to hydrations and dehydrations broadly, there being certain specific examples given in the said application. This application is devoted to the specific improvement in the hydration of glycerides by the use of alternating current.

The principal object of the present invention therefore is to accelerate the hydration of glycerides by the use of alternating current.

Another object of the present invention lies in the provision of a novel method or methods employing alternating current to not only accelerate the hydration of glycerides, but which method is adapted to either entirely eliminate the use of certain catalysts that are now deemed necessary, or to partially eliminate the use of these catalysts.

Other objects will appear from the following description and appended claims.

In accordance with the principles of the present invention, I introduce two spaced electrodes (i. e. electrical conductors, such as lead, platinum, or chromium plated posts) into the vat or container holding the materials being treated by any of the above named processes, and pass alternating current between these electrodes with the result that the hydration reaction in each such case is speeded up to a point where the glycerides are converted into fatty acids and glycerine in a far shorter time than at present required. Thus, in the case of the most popular method, namely, the Twitchell process, by using my electrodes and passing current therebetween, I have found that instead of consuming thirty-two to thirty-six hours to complete the reaction, I can complete the reaction within from six to eight hours.

It is generally understood that the velocity of the hydration reaction is proportional to the number of ions present and active in producing the same. Evidently the passage of current in alternate directions through the mixture acts to greatly increase the number of ions present in the mixture. Since the alternating current flows in both directions at rapidly recurring intervals, it would appear that no chemical changes or decomposition of the chemicals of the mixture takes place so long as the magnitude of the current is not increased beyond the point where the heating effect of the current causes decomposition products to be formed. This conclusion has been reached as the result of extensive tests that I have made, which tests will be further described.

I have found that not only does an increase in the alternating current applied to the mixture act to increase the speed of the reaction, but that an increase in the quantity of the catalytic agent or agents used has a similar effect. In both cases, however, there is an upper limit where additional current or additional catalytic agent will either cause the production of decomposition products, thereby retarding the reaction, or the reaction will tend to reverse itself so that the fatty acids and glycerine will be reconverted back into glycerides.

The tabulated results of a number of illustrative tests will now be given. Although concentrated sulphuric acid and Twitchell reagent were used in these tests as the catalytic agents, it is to be understood that this invention is not limited to the use of these particular reagents, but other reagents having similar action may be used in lieu thereof. Thus, instead of using sulphuric acid, other acids such as hydrochloric acid and phosphoric acid, may as well be used, or even acid salts, such as sodium hydrogen sulphate may be used. Instead of using the Twitchell reagent, there are any number of organic compounds which may be used in lieu of this reagent. For example, sulpho oleic acid, sulphonated castor oil, or any of the fat splitting or emulsifying catalysts mentioned in U. S. Patent #1,840,349 or in the British Patents #347,592 and #347,527 of Jan. 22, 1927 may be used. Thus, any catalysts which will create a sufficiently fine state of sub-division of the oil or fat in water can be used. In all of the following tests, the mixtures were kept at substantially the boiling point of water during the several runs by use of an open steam coil immersed in the mixtures.

*Run #1*

| Ingredients | Per cent by weight |
|---|---|
| Sulphuric acid (60° Baumé) | 1 |
| Twitchell reagent | 1 |
| Water | 40 |
| Olive oil | 58 |

Current: 0.1 ampere at 1 to 3 volts applied.
Run one hour.
Conversion: 30.2% fatty acids.

Same: run two hours.
Conversion: 45% fatty acids.

Same: run nine hours.
Conversion: 60% fatty acids.

In the above test, copper wires were used as electrodes, which wires were spaced four inches apart. The reason that the conversion was so low in this test was because of the relatively low amperage used, namely, 0.1 ampere.

*Run #2*

| Ingredients | Per cent by weight |
|---|---|
| Sulphuric acid (60° Baumé) | 3 |
| Twitchell reagent | 1 |
| Water | 38 |
| Olive oil | 58 |

Current: .25 amperes. 3 to 5 volts applied.
Run one hour.
Conversion: 38% fatty acids.

Same: run two hours.
Conversion: 60% fatty acids.

Same: run three hours.
Conversion: 77% fatty acids.
Four hours: 86%—six hours: 91% 9 hours: complete.

In this second run, copper wires were used as electrodes, which wires were spaced four inches apart. In this test, complete conversion to fatty acids and glycerine was obtained in nine hours, showing the effect of increasing the acid content and the amperes supplied.

*Run #3*

| Ingredients | Per cent by weight |
|---|---|
| Sulphuric acid (60° Baumé) | 0.1 |
| Twitchell reagent | 1 |
| Water | 40.9 |
| Olive oil | 58 |

Current: 0.5 amperes—25 volts applied.
Run one hour.
Conversion: 21% fatty acids.
Not completed. Too slow.

In this test, the electrodes used were copper strips one-half inch wide and were placed four inches apart in the mixture. Owing to the extremely small amount of acid 0.1% and to the low current, namely, 0.5 amperes used, the conversion was very low, namely 21%.

*Run #4*

| Ingredients | Per cent by weight |
|---|---|
| Sulphuric acid (60° Baumé) | 3 |
| Twitchell reagent | 1 |
| Water | 38 |
| Olive oil | 58 |

Current: 1.5 to 1.7 amperes. 1 to 5 volts applied.
Run two hours:
Conversion: 63% fatty acids.

Same:
Run four hours:
Conversion: 84% fatty acids.

Same:
Run six hours.
Conversion: complete.

In this test, copper strips one-half inch wide were used, spaced four inches apart in the solution. Owing to the large amount of current, namely, 1.5 to 1.7 amperes passed through the mixture and to the use of a reasonable amount of sulphuric acid, namely, 3%, complete conversion was obtained in six hours.

*Run #5*

| Ingredients | Per cent by weight |
|---|---|
| Sulphuric acid (60° Baumé) | 2 |
| Twitchell reagent | 1 |
| Water | 39 |
| Olive oil | 58 |

Current: 3.9 to 4.5 amperes at 20 to 22 volts applied.
Run: two hours.
Conversion: 40% fatty acids.

In this test, owing to the excessive amount of current used, namely, 3.9 to 4.5 amperes, the reaction tended to reverse itself and decomposition products tended to form so that a relatively small conversion was obtained.

As a result of these and additional tests, I conclude that as the percentage of acid is increased, the voltage applied across the electrodes and the current supplied must be reduced to prevent the formation of decomposition products, and the reversal of the reaction. Likewise, as the percentage of acid is decreased, the voltage applied and current supplied must be increased in order to maintain the desired speed of reaction. From the above tests it is indicated the best results were obtained when 3% of concentrated sulphuric acid and 1% of Twitchell reagent were used and approximately one and one-half amperes were passed through the solution, resulting in complete conversion of the glycerides to fatty acids and glycerine in six hours as against thirty to thirty-six hours heretofore required.

The choice of metal, or alloy or non-metal used for the electrodes has been found to be very important, since electrodes which contaminate the mixture, adversely effect the emulsifying agents and consequently will slow up the reaction. The current in the above tests was supplied at 60 cycle frequency for reasons of convenience, the said current being easily obtainable at this frequency. Actually, however, a greater or lesser frequency may be used without noticeable differences in the results.

I have found when using alternating current for hastening the hydration of glycerides, that the use of the preliminary treatment of the fats or oils with the dilute sulphuric acid for one hour to remove impurities, such as pectins, albuminous and other materials, may be dispensed with, thereby cutting another hour off of the total period required to perform the hydration operation. The above tests were all run without first using the preliminary dilute sulphuric acid treatment. It will also be noted that I did not find it necessary to use additional acid after the run was partly over as has heretofore been the case where alternating current is not used. Thus, not only does my method effect an enormous saving in the time required to hydrate glycerides, but at the same time I may effect a substantial saving in the use of catalysts.

What is claimed is:

1. The method of accelerating the hydration of glycerides in the presence of an acid catalyst arranged to ionize when in an aqueous solution with the glycerides comprising, passing alternating current through the mixture of glycerides and catalyst, the passage of such alternating current serving to enhance the catalytic action of the catalyst.

2. The method of accelerating the hydration of glycerides intermixed in an aqueous solution with a relatively small quantity of ionized emulsifying agents, which method consists in passing alternating current through the mixture of glycerides and emulsifying agents while maintaining the mixture at substantially the boiling point of water, the alternating current serving to increase the ion concentration of the aqueous solution.

3. The method of accelerating the hydration of glycerides intermixed with a relatively small quantity of acid emulsifying agents in an aqueous solution, which method consists in passing a limited quantity of alternating current through the mixture of glycerides and emulsifying agents for about eight hours, while maintaining the mixture at substantially the boiling point of water and agitating the same, the alternating current serving to increase the ion concentration of the aqueous solution, whereby the effectiveness of the emulsifying agents is enhanced.

4. The method of accelerating the hydration of glycerides intermixed in an aqueous solution with an acidulous substance capable of producing hydrogen ions in the mixture, said method comprising the insertion of spaced electrically conducting poles into the intermixed substances and passing alternating current between said spaced poles for a limited time.

5. The method of accelerating the hydration of glycerides intermixed in an aqueous solution with a small quantity of suitable acid and an emulsifying agent, said method comprising the insertion of spaced electrically conducting poles into the intermixed substances and passing a small quantity of alternating current between said spaced poles for a limited time.

6. The method of accelerating the hydration of glycerides comprising, intermixing the following ingredients in the percentage given by weight:

| | Percent |
|---|---|
| Sulphuric acid (60° Baumé) | 3 |
| Twitchell reagent | 1 |
| Water | 38 |
| Olive oil | 58 | inserting spaced electrically conducting poles into said mixture and passing alternating current between said poles for approximately six hours.

ERWIN F. SPELLMEYER.